United States Patent [19]
Lawrence

[11] Patent Number: 6,092,852
[45] Date of Patent: Jul. 25, 2000

[54] REMOVABLE STORAGE ASSEMBLY FOR A TRUCK BED

[76] Inventor: Michael A. Lawrence, 430 Maple Hill, Rochester Hills, Mich. 48306

[21] Appl. No.: 09/086,150

[22] Filed: May 28, 1998

[51] Int. Cl.[7] .................................................. B60R 9/06
[52] U.S. Cl. ......................... 296/37.6; 224/404; 220/841
[58] Field of Search .................. 296/37.6; 224/402–404; 220/836, 841, 827, 829

[56] References Cited

U.S. PATENT DOCUMENTS

| | | | |
|---|---|---|---|
| 4,451,075 | 5/1984 | Canfield | 296/37.6 |
| 4,828,312 | 5/1989 | Kinkel et al. | 296/37.6 |
| 5,094,375 | 3/1992 | Wright | 224/404 |
| 5,169,200 | 12/1992 | Pugh | 296/37.6 |
| 5,207,469 | 5/1993 | Rossi | 296/37.6 |
| 5,524,951 | 6/1996 | Johnson | 296/37.6 |
| 5,564,768 | 10/1996 | Saffold | 296/37.6 |
| 5,564,776 | 10/1996 | Schlachter | 296/37.6 |
| 5,584,521 | 12/1996 | Hathaway et al. | 296/37.6 |

*Primary Examiner*—Dennis H. Pedder
*Attorney, Agent, or Firm*—Howard & Howard

[57] ABSTRACT

A removable storage assembly (24) for a truck bed cargo area (12) of the type having a first inner side wall (16) having a first lip (18) extending inwardly, and a second inner side wall (20) having a second lip (22) extending inwardly. The removable storage assembly (24) includes a lid (26) having flanges (28) for extending between the first inner side wall (16) and the second inner side wall (20). The flanges (28) extending over and positioned above the first lip (18) and the second lip (22). The lid (26) is characterized by a first tab (30) and a second tab (32) extending from the lid (26) below the flanges (28) and disposed under the first lip (18) and the second lip (22) to retain the lid (26) and to allow pivotal rotation of the lid (26) from a closed position (34) to an open position (36).

16 Claims, 4 Drawing Sheets

REMOVABLE STORAGE ASSEMBLY FOR A TRUCK BED

BACKGROUND OF THE INVENTION

1. Field of the Invention

The present invention relates generally to storage boxes for motor vehicles, and more particularly to a removable storage assembly for use in the bed of a pick-up truck having a removable bucket which remains accessible when a tonneau type bed cover is installed.

2. Description of the Prior Art

Storage compartments for use in vehicles of the type with open cargo bed areas are widely known in the prior art. Various assemblies for efficiently securing and storing articles in the otherwise open cargo bed area have been designed in the attempt to provide security and accessibility to these articles while allowing convertibility to the vehicle's full cargo capacity. It will be appreciated that the combination of accessibility, security, and convertibility, while desirable, is difficult to achieve.

Tonneau type bed covers formed of a soft cloth material or a rigid plastic material are widely used to cover the entire truck bed. This type of cover effectively conceals articles within a truck bed while minimizing aerodynamic drag of the otherwise open cargo bed area. However, this type of cover is somewhat inconvenient to install and remove, fails to offer any protection from theft and is unable to prevent the shifting of relatively small articles stored in the bed.

Safford, U.S. Pat. No. 5,564,768, discloses a portable trunk apparatus that creates an enclosed area in the rear bed of trucks and sport utility vehicles. The trunk apparatus includes a connector rod which hingedly connects the front wall to the top wall. The front wall is secured against the floor of the truck and the top wall is secured against the rear wall of the truck. However, once installed the connector rod does not act as an axle to allow the rotational opening of the trunk apparatus. The disclosed trunk apparatus is accessible only through the lockable rear gate door of the truck.

Canfield, U.S. Pat. No. 4,451,075 discloses a removable cover for a pickup truck bed having a sloping back wall and an upper lid to create a storage area. The upper lid and the sloping back wall are pivotally connected by a hinge. Retractable pin latches are located on opposite sides of the lower portion of the sloping back wall and engage holes within the truck bed wheel wells. Canfield therefore disadvantageously requires modification to the vehicle structure and fails to provide full use of, and ready access to, the forward portion of the sloping storage area.

SUMMARY OF THE INVENTION AND ADVANTAGES

A truck bed comprising a bed floor, a first inner side wall having a first lip extending inwardly and a second inner side wall having a second lip extending inwardly. A removable storage assembly including a lid having flanges extends over and is positioned above the first lip and the second lip. The lid is characterized by a first tab and a second tab extending from the lid below the flanges. The second tab and the first tab are disposed under the first lip and the second lip to retain the lid and to allow pivotal rotation of the lid from a closed position to an open position.

Accordingly, the present invention provides a removable storage assembly for use in a truck bed wherein the lid is slidably positioned on the inwardly extending side wall lips providing pivotal rotation of the lid from a closed position to an open position. The novel relationship between the tabs, flanges and inner side wall lips advantageously provides a direct mounting system applicable to any conventional pickup truck bed. Further, the present invention provides an accessible yet secure removable storage assembly which does not require modification to the vehicle structure.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
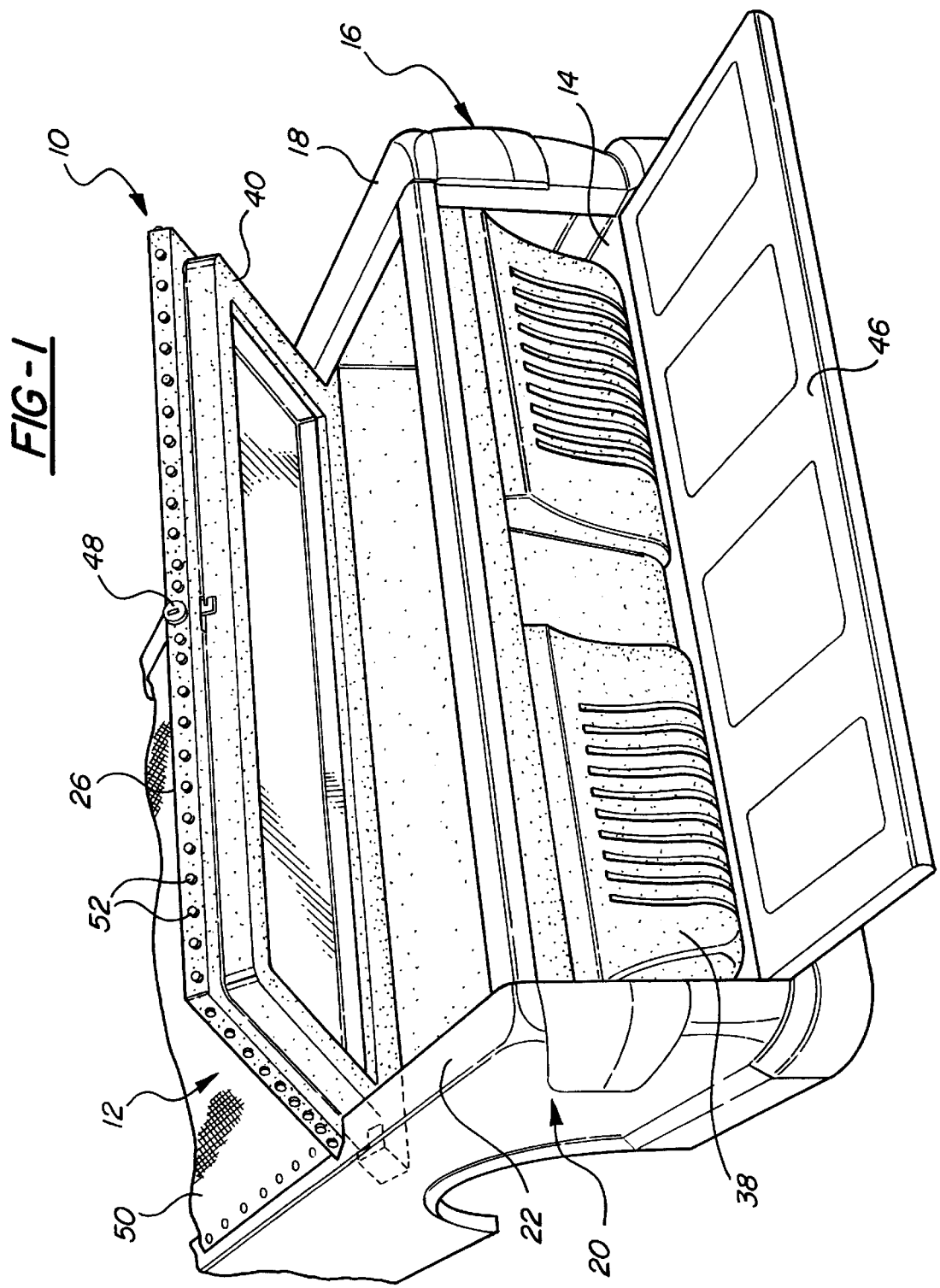
FIG. 1 is a partial isometric view of a pickup truck cargo area having a removable storage assembly of the present invention.

Referring to the Figures, wherein like numerals indicate like or corresponding parts throughout the several views, a pick-up truck having a removable storage assembly of the present invention is generally shown at 10 in FIG. 1. A standard pickup truck 10 includes a cargo area 12 having a bed floor 14, a first inner side wall 16 having a first lip 18 extending inwardly, and a second inner side wall 20 having a second lip 22 extending inwardly.

Figure 2:
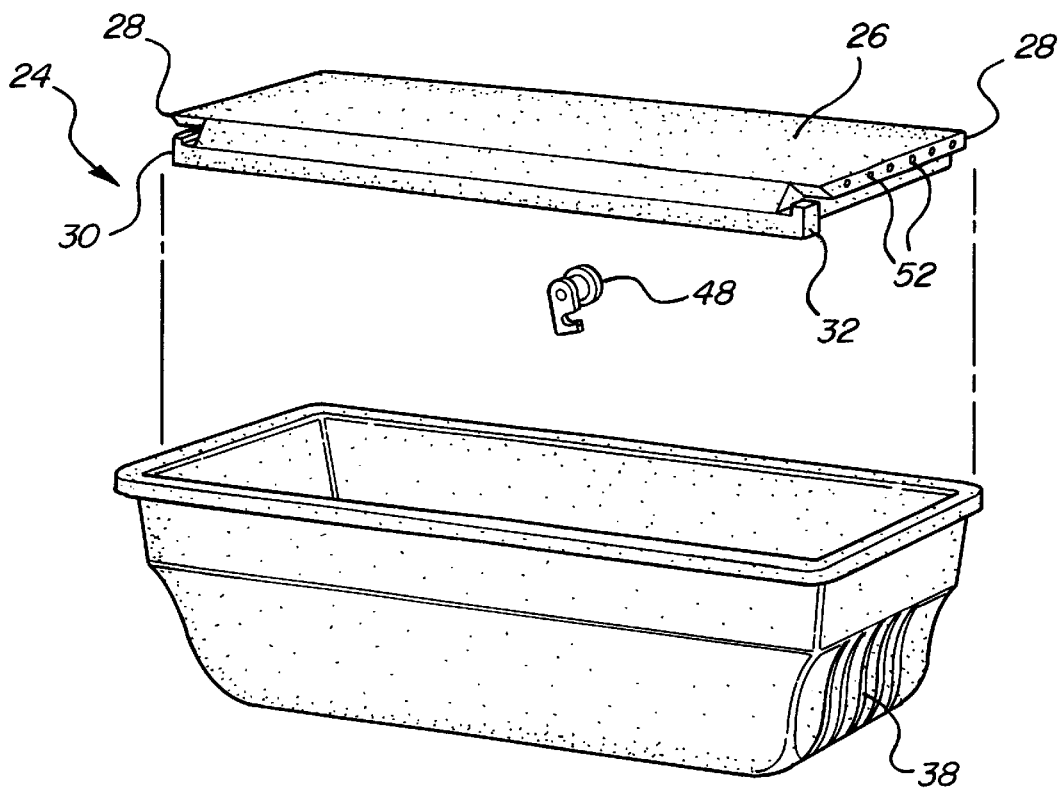
FIG. 2 is an isometric view of the removable storage assembly of the present invention.
Figure 4:
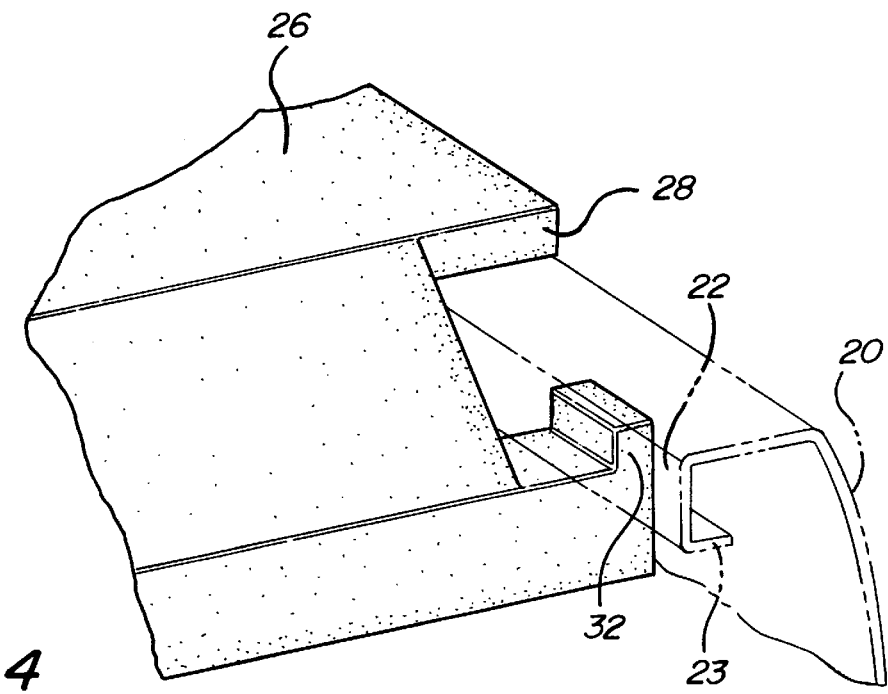
FIG. 4 is an enlarged sectional view of the removable storage assembly of the present invention showing the relationship between the inwardly facing lips of the inner wall and the lid.
Figure 3:
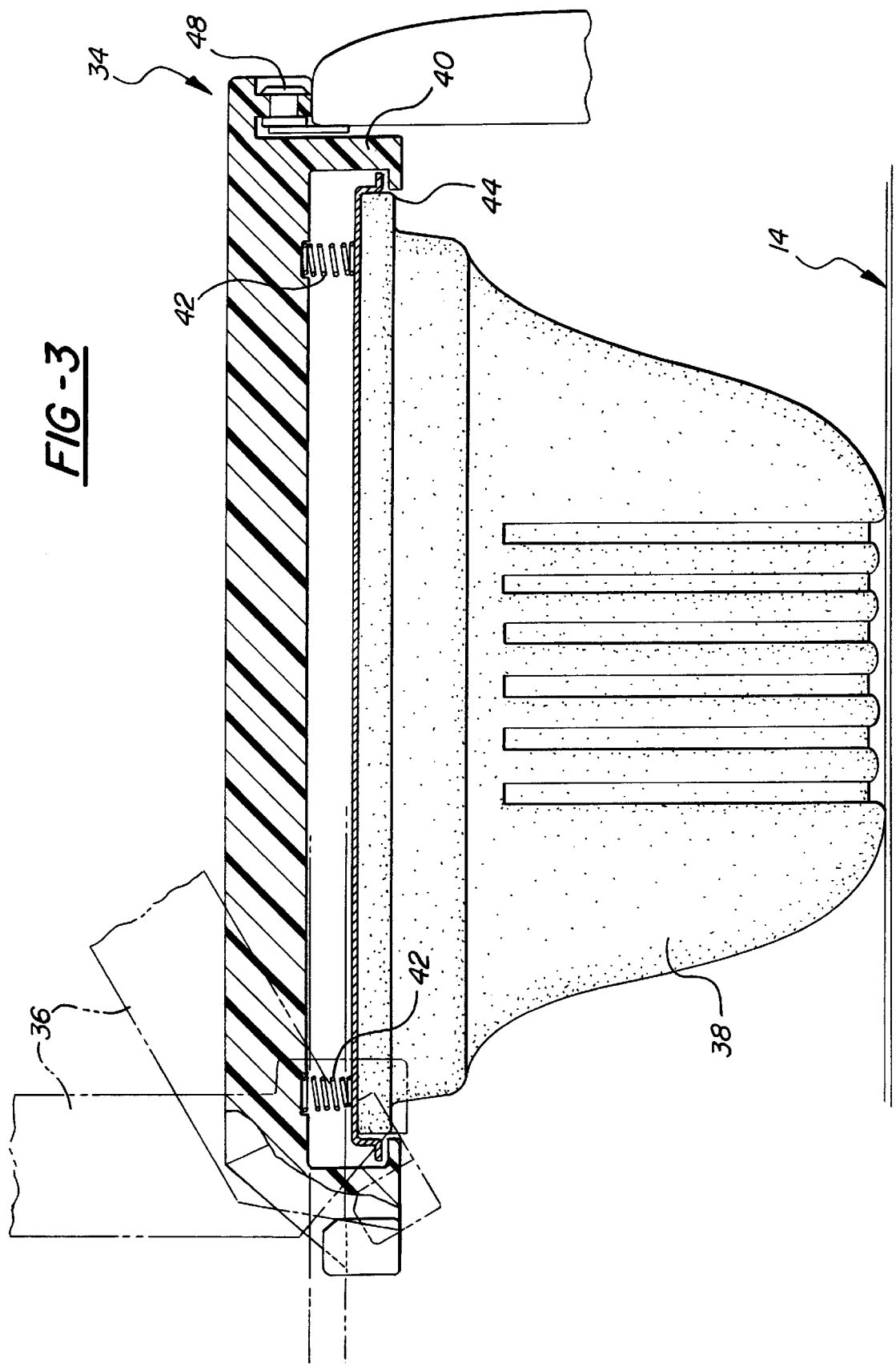
FIG. 3 is an enlarged sectional view of the removable storage assembly of the present invention wherein the lid is shown in an open position by phantom lines and a closed position by solid lines.

Referring to FIGS. 2, 3 and 4, a removable storage assembly 24 includes lid 26 having flanges 28 extending over and positioned above the first lip 18 and the second lip 22. Specifically, the lid 26 includes a first tab 30 and a second tab 32 extending from the lid 26 below the flanges 28. The tabs 30,32 are disposed under the first lip 18 and the second lip 22 to retain the lid 26 thereby allowing the pivotal rotation of the lid 26 from a closed position 34 to an open position 36. To maintain this open position 36 at least one of the tabs 30,32 includes a flat 33a (FIG. 5) corresponding to a 45 degree lid 26 open position 36. The open position 36, although shown preferably at 45 degrees, is not intended to limit the lid 26 to but one open position, and it is understandable to provide for a plurality of such open positions.

A removable bucket 38 for securely storing various articles is disposed between the bed floor 14 and the lid 26 while the lid 26 is in the closed position 36. The removable bucket 38 advantageously provides a removable storage capability independent of the cargo area 12 within the truck bed 14. The lid 26 provides access to the removable bucket 38 when installed within the truck bed 14 and preferably includes a vertical overlap area 40 corresponding to the size of the removable bucket 38. The vertical overlap area 40 positionally locates the removable bucket 38 on the bed floor 14. The vertical overlap area 40 preferably includes a biasing means 42 between the lid 26 and the vertical overlap area 40 for imparting a force on the removable bucket 38 whereby the removable bucket 38 is sandwiched between the bed floor 14 and the lid 26 in the closed position 34. As appreciated by those skilled in the art, biasing means 42 are well known and examples of such means include devices such as springs and compressible foam. The lid 26 may further include a water tight seal 44 between the lid 26 and the removable bucket 38.

Referring back to FIG. 1, a standard pickup truck 10 normally provides a tailgate 46 having a raised and a lowered position at the end of the bed floor 14. To increase the security of articles located in the removable bucket 38, the lid 26 preferably includes a lock module 48 for securing the lid 26 to the tailgate 46. As appreciated by those skilled in the art, the lid 26 may also provide an independent locking device thereby allowing the lid 26 to be operated independently of the tailgate 46. As a deterrent to theft, the entire storage assembly may be concealed beneath a tonneau type bed cover 50.

The lid 26 may therefore directly provide attachment devices 52 such as snaps or clips for the bed cover 50. Additionally, to further aid concealment of the storage assembly, the lid 26 is preferably flush with the first and second inner side walls 16,20 when in the closed position 34.

Figure 5:
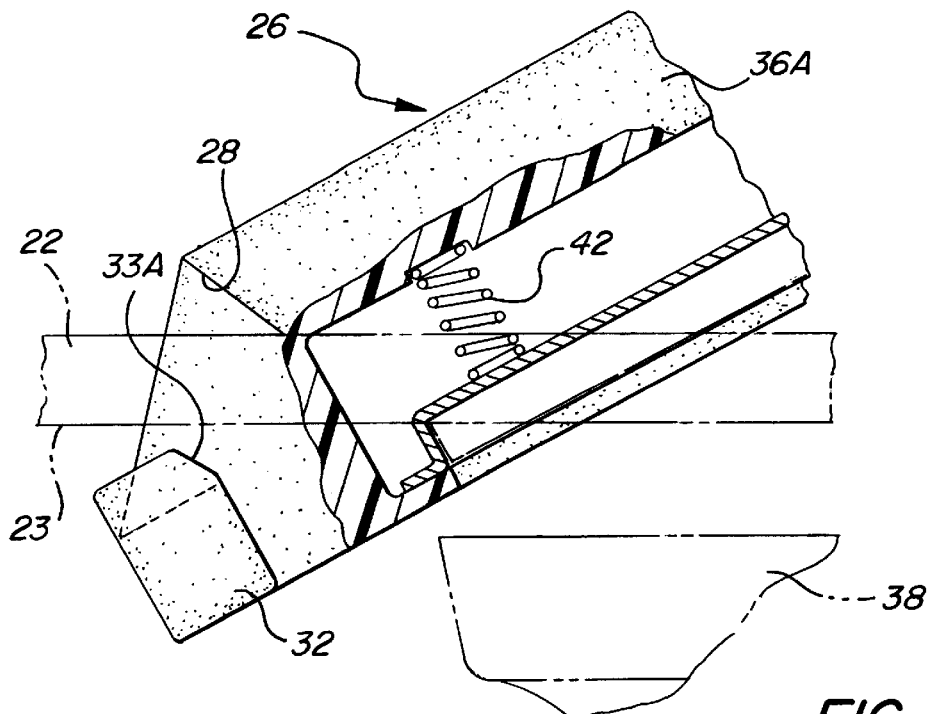
FIG. 5 is an enlarged sectional view of the removable storage assembly of the present invention showing a hinge of a lid in a partially open position.
Figure 6:
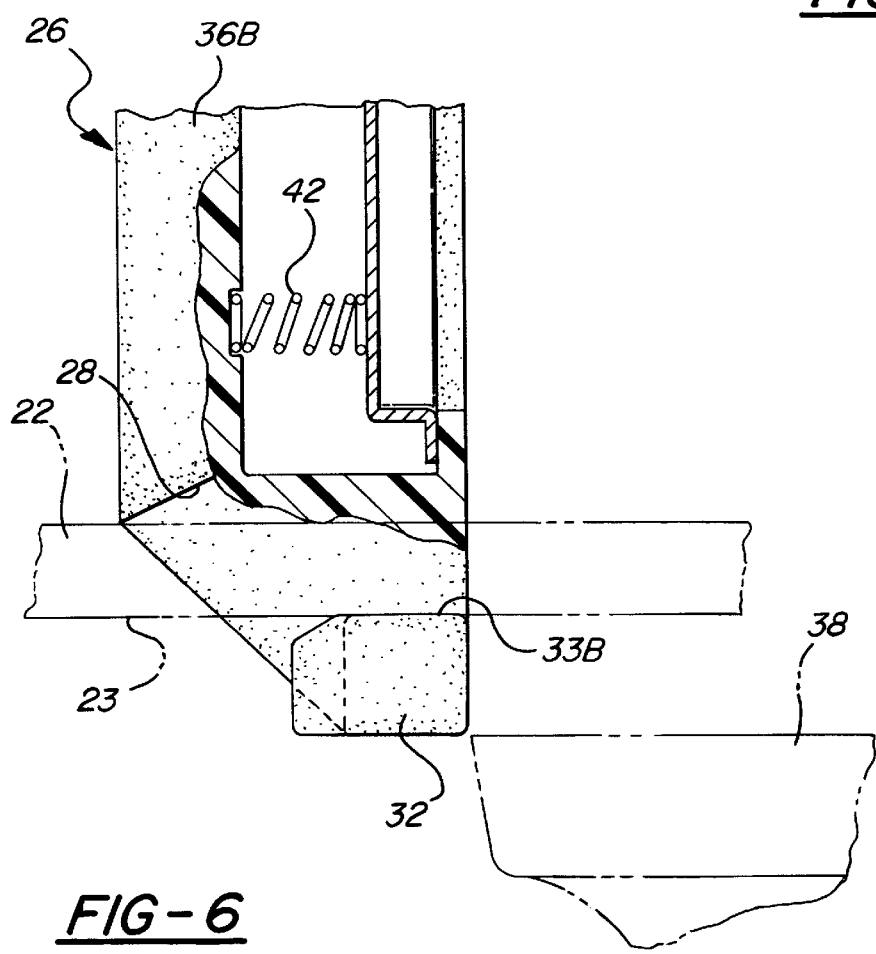
FIG. 6 is an enlarged sectional view of the removable storage assembly of the present invention showing a hinge of a lid in an open position.

Referring to FIG. 4, 5 and 6, the lid 26 is shown being opened. The second lip 22 is located between the tab 32 and the flange 28 with sufficient clearance to allow the pivotal rotation of the lid 26 to an open position 36. To maintain a partial open position 36a, the lid 26 is laterally shifted away from the side wall 20 such that the flat 33a of tab 32 engages an underside 23 of the second lip 22. The lid 26 thereby traps the second lip 22 between the flat 33a and the flange 28. Flat 33a preferably corresponds to a 45° open position, however, it is understandable that multiple flats may be provided to achieve a plurality of such open positions.

To maintain the lid 26 at a fully open position 36b of FIG. 6, the lid 26 is rotated further to a 90° open position. The lid 26 is then laterally shifted away from the side wall 20 such that lid 26 traps underside 23 of the second lip 22 between a second flat 33B of tab 32 and the flange 28. Although only one side is illustrated it will be realized that the prior description is applicable to the opposite side of the lid 26 by laterally shifting the lid 26 in the opposite direction, e.g. away from side wall 16 (FIG. 2).

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:
1. A truck bed comprising,
a bed floor (14),
a first inner side wall (16) having a first lip (18) extending inwardly,
a second inner side wall (20) having a second lip (22) extending inwardly,
a removable storage assembly (24) including a lid (26) having flanges (28) extending over and positioned above said first lip (18) and said second lip (22),
said lid (26) characterized by a first tab (30) and a second tab (32) extending from said lid (26) below said flanges (28) and disposed under said first lip (18) and said second lip (22) to retain said lid (26) and to allow pivotal rotation of said lid (26) from a closed position (34) to an open position (36), said flanges (28) being adjacent said first inner side wall (16) and said second inner side wall (20) when said lid (26) is in said closed position (34), at least one of said first tab (30) and said second tab (32) having a flat (33) to trap one of said lips (18,22) between said flat (33) and said flanges (28) to maintain said lid (26) in said open position (36) above a horizontal plane defined by said first lip (18) and said second lip (22).

2. An assembly as set forth in claim 1 further comprising a removable bucket (38) disposed between said bed floor (14) and said lid (26) in said closed position (34).

3. An assembly as set forth in claim 2 wherein said lid (26) includes a vertical overlap area (40) corresponding to said removable bucket (38) for positionally locating said removable bucket (38) on said bed floor (14).

4. An assembly as set forth in claim 3 including biasing means (42) between said lid (26) and said vertical overlap area (40) for imparting a force on said removable bucket (38) whereby said removable bucket (38) is sandwiched between said bed floor (14) and said lid (26) closed position (34).

5. An assembly as set forth in claim 4 wherein said lid (26) includes a water tight seal (44) between said lid (26) and said removable bucket (38).

6. An assembly as set forth in claim 5 wherein said truck bed cargo area (12) includes a tailgate (46) having a raised and a lowered position at the end of said bed floor (14), and said lid (26) includes a lock module (48) for securing said lid (26) to said tailgate (46).

7. An assembly as set forth in claim 6 wherein said lid (26) includes attachment means (52) for a truck bed cover (50).

8. An assembly as set forth in claim 7 wherein said lid (26) is substantially concealed when a truck bed cover (50) is installed, said flanges (28) having attachments (52) to retain said truck bed cover (50) to said lid (28), and said flanges (28) being adjacent said first inner side wall (16) and said second inner side wall (20) when said lid (26) is in said closed position (34).

9. A removable storage assembly (24) for a truck bed cargo area (12) of the type having a first inner side wall (16) having a first lip (18) extending inwardly, and a second inner side wall (20) having a second lip (22) extending inwardly, said removable storage assembly (24) comprising,
a lid (26) having flanges (28) for extending between the first inner side wall (16) and the second inner side wall (20), said flanges (28) extending over and positioned above the first lip (18) and the second lip (22),
said lid (26) characterized by a first tab (30) and a second tab (32) extending from said lid (26) below said flanges (28) and disposed under said first lip (18) and said second lip (22) to retain said lid (26) and to allow pivotal rotation of said lid (26) from a closed position

(34) to an open position (36), said flanges (28) being adjacent said first inner side wall (16) and said second inner side wall (20) when said lid (26) is in said closed position (34), at least one of said first tab (30) and said second tab (32) having a flat (33) to trap one of said lips (18,22) between said flat (33) and said flanges (28) to maintain said lid (26) in said open position (36) above a horizontal plane defined by said first lip (18) and said second lip (22).

10. An assembly as set forth in claim 9 further comprising a removable bucket (38) for disposition between a bed floor (14) and said lid (26) in said closed position (34).

11. An assembly as set forth in claim 10 wherein said lid (26) includes a vertical overlap area (40) corresponding to said removable bucket (38) for positionally locating said removable bucket (38) on the bed floor (14).

12. An assembly as set forth in claim 11 including biasing means between said lid (26) and said vertical overlap area (40) for imparting a force on said removable bucket (38) whereby said removable bucket (38) is sandwiched between the bed floor (14) and said lid (26) closed position (34).

13. An assembly as set forth in claim 12 wherein said lid (26) includes a water tight seal (44) between said lid (26) and said removable bucket (38).

14. An assembly as set forth in claim 13 wherein the truck bed cargo area (12) includes a tailgate (46) having a raised and a lowered position and said lid (26) includes a lock module (48) for securing said lid (26) to the tailgate (46).

15. An assembly as set forth in claim 14 wherein said lid (26) includes attachment means for a truck bed cover (50).

16. An assembly as set forth in claim 15 wherein said lid (26) is substantially concealed when a truck bed cover (50) is installed, said flanges (28) having attachments (52) to retain said truck bed cover (50) to said lid (28), and said flanges (28) being adjacent said first inner side wall (16) and said second inner side wall (20) when said lid (26) is in said closed position (34).

* * * * *